(12) United States Patent
Gray

(10) Patent No.: US 11,185,146 B2
(45) Date of Patent: Nov. 30, 2021

(54) APPARATUS FOR PRACTICING THE APPLICATION OF EYELASH EXTENSIONS

(71) Applicant: THE EYELASH TRAINER LIMITED, Yorkshire (GB)

(72) Inventor: Susan Gray, Yorkshire (GB)

(73) Assignee: The Eyelash Trainer Limited, Yorkshire (GB)

(*) Notice: Subject to any disclaimer, the term of this patent is extended or adjusted under 35 U.S.C. 154(b) by 0 days.

(21) Appl. No.: 16/075,658

(22) PCT Filed: Feb. 5, 2017

(86) PCT No.: PCT/IB2017/050625
§ 371 (c)(1),
(2) Date: Aug. 5, 2018

(87) PCT Pub. No.: WO2017/134634
PCT Pub. Date: Aug. 10, 2017

(65) Prior Publication Data
US 2019/0082811 A1 Mar. 21, 2019

(30) Foreign Application Priority Data
Feb. 5, 2016 (GB) .................. 1602070

(51) Int. Cl.
A45D 44/14 (2006.01)
G09B 25/00 (2006.01)
G09B 19/00 (2006.01)

(52) U.S. Cl.
CPC ......... A45D 44/14 (2013.01); G09B 19/0076 (2013.01); G09B 25/00 (2013.01)

(58) Field of Classification Search
CPC ..... A45D 44/14; G09B 19/0076; G09B 25/00
(Continued)

(56) References Cited

U.S. PATENT DOCUMENTS 3,210,884 A * 10/1965 Sharff ................ A63H 3/16
446/100
3,489,383 A * 1/1970 Anson ................ A01G 3/06
248/231.71
(Continued)

FOREIGN PATENT DOCUMENTS

FR 2533452 3/1984
JP 2012170654 9/2012
(Continued)

OTHER PUBLICATIONS

UK Search and Examination Report in GB1602070.3, dated May 27, 2016.
(Continued)

Primary Examiner — Jerry-Daryl Fletcher
Assistant Examiner — Jennifer L Korb
(74) Attorney, Agent, or Firm — William H. Bollman

(57) ABSTRACT

An eyelash application practice apparatus has a head with a face section and a base for supporting the head. The face section has a plurality of eye zones. The eye zones include a plurality of displaceable parts including at least one eyelid with a closure mechanism that allows the at least one eyelid to be displaced to one of a plurality of discrete positions between a first open eye position and a second closed eye position.

12 Claims, 9 Drawing Sheets

(58) Field of Classification Search
USPC .......................................................... 434/94
See application file for complete search history.

(56) References Cited

U.S. PATENT DOCUMENTS

| | | | | |
|---|---|---|---|---|
| 3,672,096 A | * | 6/1972 | Johmann | A63H 13/00 |
| | | | | 446/338 |
| 5,900,923 A | * | 5/1999 | Prendergast | G09B 23/28 |
| | | | | 351/221 |
| 9,010,341 B1 | * | 4/2015 | Lee | A41G 5/004 |
| | | | | 132/201 |
| 2008/0293324 A1 | | 11/2008 | Friedland | |
| 2009/0111081 A1 | | 4/2009 | Nylen | |
| 2015/0072317 A1 | | 3/2015 | Dana | |
| 2019/0019434 A1 | * | 1/2019 | Hastings | G16H 50/50 |

FOREIGN PATENT DOCUMENTS

| | | | | |
|---|---|---|---|---|
| JP | 2015085066 | | 5/2015 | |
| TW | 315508 U | | 2/1996 | |
| WO | WO2010/001164 | | 1/2010 | |
| WO | WO-2010001164 A2 | * | 1/2010 | ......... G09B 19/0076 |

OTHER PUBLICATIONS

EPO Office Action, EP 17706593.5, dated Mar. 10, 2021.
Office Action in Chinese Invention Patent Application No. 2017800101288, dated Aug. 12, 2021 (English Summary Attached).

* cited by examiner

APPARATUS FOR PRACTICING THE APPLICATION OF EYELASH EXTENSIONS

FIELD OF THE INVENTION

The present invention relates to an eyelash application practice apparatus, in particular a practice apparatus comprising a face; more particularly but not exclusively a practice apparatus comprising a face with eye zones for practising application of eyelash extensions or makeup.

BACKGROUND

Increasing awareness and focus in many societies on physical appearance, and a contemporaneous lack of free time leads many to seek professional services.

In particular, many may seek help from eyelash technicians, make-up artists and beauticians. Such users have a need therefore to practise their skills. Whilst these skills are often practised on a person there are occasions when people may not be available for training purposes, or when skills can be as readily taught on a mannequin. However, existing mannequins lack features that make the application process true to life and therefore do not provide adequate training aids.

PRIOR ART

Accordingly a number of patent applications have been filed in an attempt to resolve the problem or similar, including the following:

Korean Patent Application KR20140094198 (SHIN) relates to a mannequin for practising semi-permanent make-up.

French Patent Application FR2533452 (BERCHET) discloses a head whose external appearance may be modified.

Japanese Patent Application JP2015085066 (MITSUYA) discloses an eyelid forming tape bonded to an eyelid portion of a mannequin.

US Patent Application US2008/0293324 (FRIEDLAND) discloses a toy doll with a moveable eyelid piece, a moveable jaw piece and at least one motor for operating the pieces.

US Patent Application US2009/0111081 (NYLEN) discloses an ophthalmologic surgery stimulation device.

US Patent Application US2015/0072317 (DANA) discloses a mannequin head with storage for tools.

Japanese Patent Application JP 2012 170 654 (SUGIYAMA) provides a head of a mannequin doll, which has simple structure and facilitates replacement of artificial eyes and a wig.

International Patent Application WO2010001164 (GRACE et al) training aid comprises a support; a cover attached to the support to represent the skin of at least part of a human face. The cover includes artificial upper eyelids; artificial eyes attached to the support so as to be visible through openings in the cover; and means operable to open and close the up-per eyelids.

The present invention can reduce economic burden on a practising person by enabling the practising person to replace only a necessary part of the main body of the mannequin. In addition, the present invention can facilitate the acquisition of a technique by enabling not only non-experts but also cosmetic professionals and make-up artists, to practise make-up more efficiently according to various types of people using the main body of the mannequin for practising make-up.

SUMMARY OF THE INVENTION

According to the present invention there is provided an apparatus for practising the application of eyelash extensions comprising: a head with a face section and a base for supporting the head, the face section has a plurality of eye zones; wherein the eye zones include a plurality of displaceable parts including at least one eyelid with a closure mechanism that allows the at least one eyelid to be displaced to one of a plurality of discrete positions between a first open eye position and a second closed eye position.

Advantageously in this way the apparatus may be provided to allow a user to practise application of eyelash extension, makeup or similar whilst the position of the eyelids can be altered to represent a real person's eyelid movements. Therefore the apparatus is ideal for use as a training aid for treatments and applications to the face.

Eye zones are regions, parts or a combination of parts or regions of an artificial human eye provided on the apparatus. The eye zones may include, but are not limited to: the eye socket, eyebrow, eyelids, eyeball, eyelashes and tear ducts.

Typically an apparatus includes pairs of eye zones arranged to represent the eye regions on a human face.

The eye zones of the present invention include at least eyelids.

The parts of the eye zones, or the entire eye zone may be displaceable on the face and/or displaceable from the face section, or face. For example, a part, such as the eyelashes, may be displaced from the eye zone so as to be removed from the apparatus. Additionally a part, such as the eyelid, may be displaced such that it is moved from a first position to a second position whilst remaining connected to the eye zone or face section, for example to represent opening and closing of the eye.

Preferably each eye zone includes top and bottom eyelids. Such eyelids comprise displaceable parts, which parts can displace with reference to other parts of the face section or face.

In some embodiments the eye zones include eyeballs, wherein the eyelids are arranged to close over the eyeballs according to user preference.

The eyelids may be fixed or secured in place on the face so that they can remain in place during training using the apparatus.

The eyelids are displaceable within the eye zone so as to simulate a user's eyelid range of movement during treatment.

For example the eyelids may be enabled to move, hinge, pivot or rotate in or on the face section or face, which provides a closure mechanism for the eyelids over the eyeballs, or region where the eyeballs would naturally be so as to simulate a range of movement during treatment.

In some embodiments the displaceable parts comprise simulated eyelashes. This provides a realistic appearance for user's when practising application of makeup or false eyelashes, or for practising eyelash tinting or curling. In this way the user may advantageously be enabled to replicate and accommodate a plurality of existing eyelash formats, when learning to apply false eyelashes to artificial ones on the apparatus.

The eyelashes may comprise wholly displaceable parts, placed into or displaced from the eyelids or eye zones. For example in some embodiments the eyelashes may be placed into or displaced from channels in the eyelids or an eye zone.

In further embodiments eyelashes may be permanently or semi-permanently installed on the eyelids. For example the eyelashes may form an integral part of the eyelid being secured to the eyelid or fixed within the channel.

In a preferred embodiment there is provided a clip with an array of eyelashes connected to the clip. The clip is arranged to be added to the eyelids such that replacement eyelashes can be fitted for each use.

Ideally the eyelashes are embedded within a material such that a user is able to practise positioning individual or multiple lashes adjacent the embedded lashes in a similar manner as to a real person.

Ideally at least the upper lids include the closure mechanism allowing said upper eyelids to move at least from a first open eye position to a second closed eye position and through a plurality of intermediate positions between. In this way the apparatus can, for example, so as to simulate half closed eyes.

In some other embodiments the lower lids may also include a closure mechanism. In this way the apparatus can simulate complete eyelid movements such as blinking.

The apparatus is arranged to enable the eyelids to be fixed at a plurality of discrete positions. The closure mechanism may be adapted to provide incremental opening and closing of the eyelids. For example, the closure mechanism may include a ratchet that enables gradual opening or closing of the eyelids by operation of the ratchet, typically by a control means. The ratchet thereby permits a selection of pre-set orientations to be achieved by activating the ratchet, for example by means of a dial, lever, or button.

In some embodiments the eyelids may be mounted on a pivot so that the, or each, eyelid can be rotated about the pivot in order to alter its position.

In some embodiments the closure mechanism may be automatic. This enables the apparatus for practising application of eyelash extensions to be able to simulate eye movements, which may be actuated in a random manner in dependence upon a signal being sent to an actuator, so that blinking is simulated.

In some embodiments eyelid movement may be controlled by an electrical switch, for example to generate a blink, twitch or squint response. The blink or squint response may be programmable such that intermittent blinking or squinting occurs at random instants in order to recreate natural eyelid movement that may occur during application of makeup or eyelashes.

Preferably the closure mechanism is arranged to enable movement of the eyelid along a vertical plane, up and down, so as to open and close an eye zone.

In some embodiments upper and lower eyelid closure mechanisms may be separate or independent mechanisms, so as to allow separate or independent use of the upper and/or lower lids.

In an alternative embodiment movement of the upper and lower eyelid of each eye zone may be linked so that the upper and lower eyelids move together.

In some other embodiments a single mechanism may be provided to control opening and closing of eyelids in two or more eye zones. In this way for example a pair of eye zones may be closed simultaneously.

In yet further embodiments the closure mechanisms may be operable jointly or separately according to user preference and control. For example the apparatus could be set to have a first eye zone with moving eyelids and a second eye zone with fixed eyelashes, or the eyelids could be fixed for one process and then moveable for another.

In some embodiments the support portion comprises a base and a stand. The base may comprise the contact surface with any subordinate structure such as a table or shelf.

In some embodiments the stand comprises an upstanding member, upstanding from the base, and a face section support connector, wherein the face section comprises a part equivalent to the face of an individual. The face section preferably has an external surface that recreates a human face facing towards the user in use.

The support connector may be in the form of sections replicating vertebrae which enable similar ranges of movement.

The head is preferably shaped to represent a human head.

The head may be shaped to represent a skull with an outer layer of skin.

The support connector may comprise a skeleton and an interface between the face section and the stand, internally facing towards the stand in use. For example the interface may represent a human neck.

In some embodiments the support connector enables movement of the face with reference to the base.

For example in some embodiments the face may be enabled to move up and down, and/or tilt or twist. In some embodiments the face may be able to be tilted about an any axis with respect to the stand, so as to simulate head movements or enable the face to reflect different orientations of a user, such as sitting or lying. The face support may comprise a ball joint to enable a suitable range of movement.

In this way the user may be advantageously introduced to realistic movement capabilities of subject, so as to perfect a client treatment technique.

In some embodiments the face section comprises a part of a head. The head may be supported on the stand and the face section supported on the head.

In another embodiment the apparatus may include multiple face sections, for example so that apparatus may be double sided enabling two practitioners to work on one apparatus.

The base may comprise weighting, so as to minimise potential of damage of injury from toppling, and to maximise resistance of the face to movement. The movement of the face with reference to the base may be variable and/or subject to resistance.

In some embodiments the face may comprise a 'wipe clean' surface, so as to enable applied substances such as makeup, or adhesive for securing eyelashes to be removed easily.

In some embodiments the surface ideally comprises a lifelike material, for example silicone in order to provide a skin like quality. The material is suitable for receiving eyelashes and or makeup.

The face has replaceable or displaceable parts, so as to allow for training purposes, and arrangement of the face in a plurality of different arrangements and to allow replacement of damaged or worn parts.

A preferred embodiment of the invention will now be described, by way of example only, and with reference to the Figures in which:

DETAILED DESCRIPTION OF FIGURES

Figure 1:
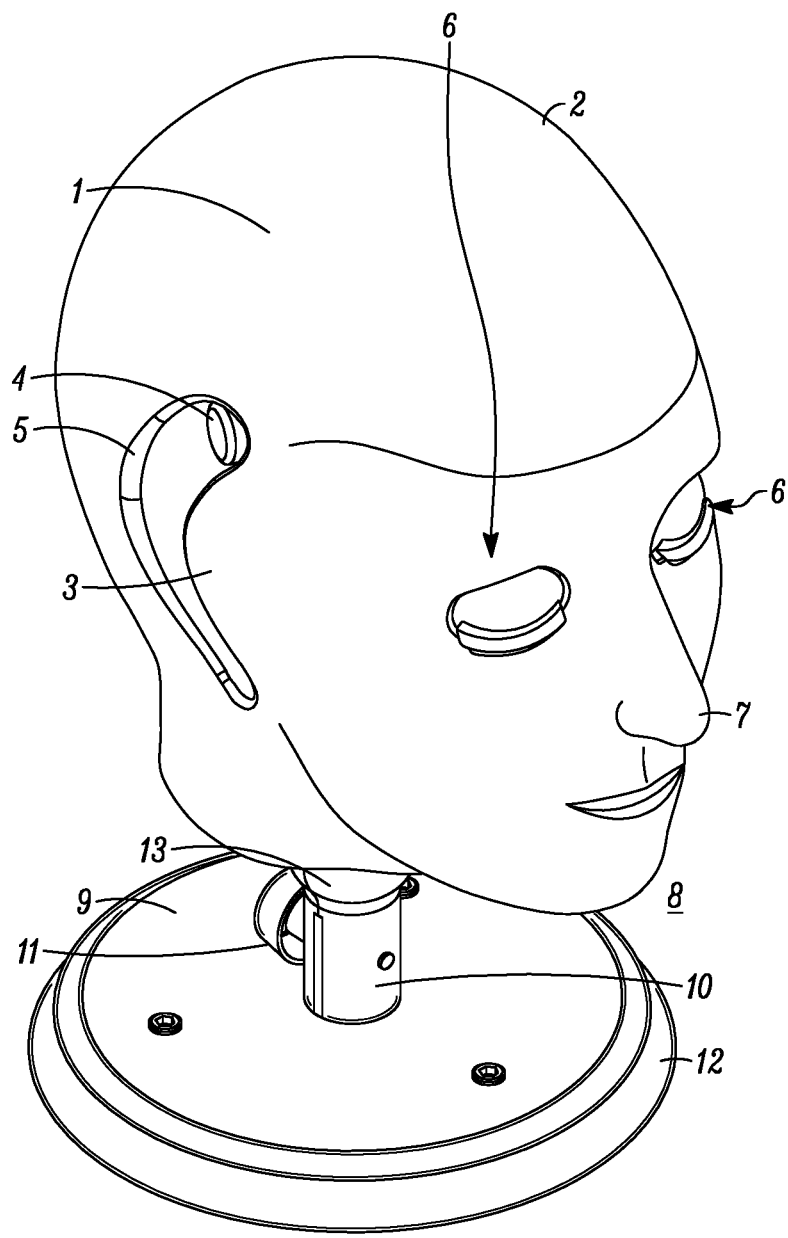
FIG. 1 shows an isometric view of an embodiment of the apparatus according to the present invention.
Figure 2:
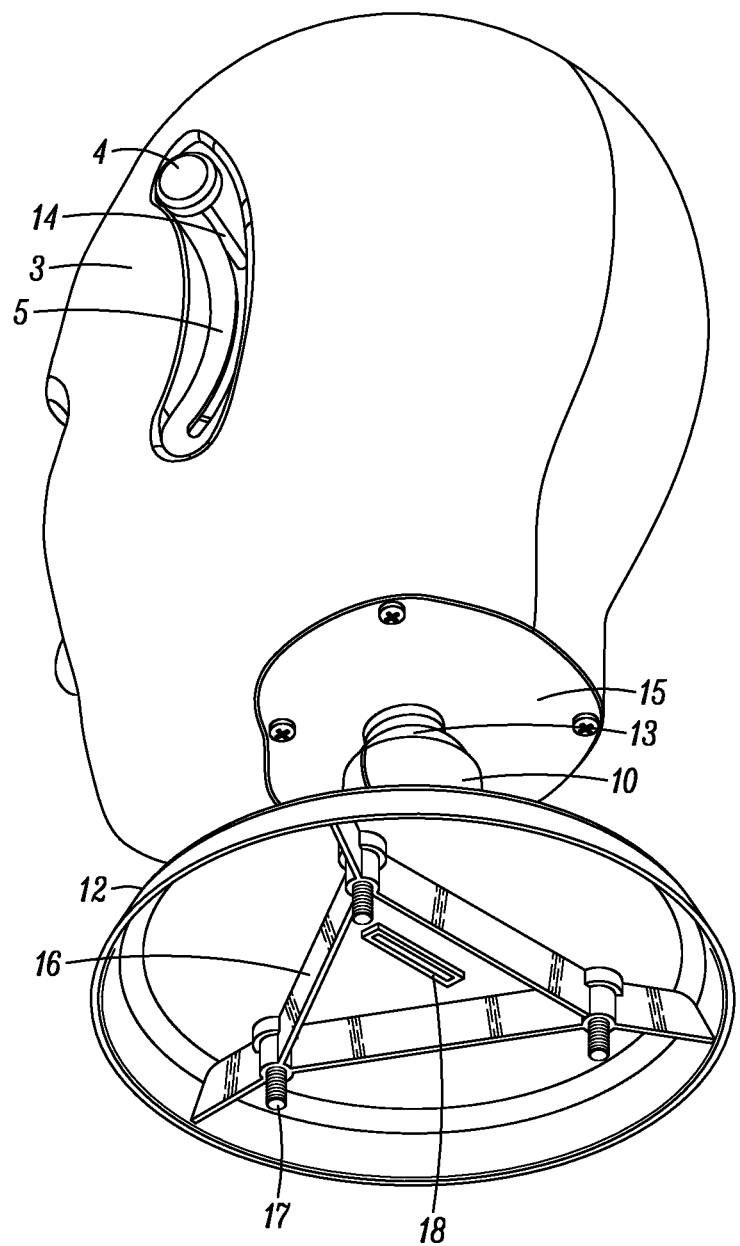
FIG. 2 shows a reverse isometric view of the embodiment shown in FIG. 1.

With reference to the figures there is shown an embodiment of the apparatus comprising a base 12 and a face 3, wherein the face is carried on a full head.

The head and base 12 are connected at a ball 13 and socket 10 joint, with a friction tightening adjustment mechanism 11, comprising a dial 111 and grub screw 110, and a tightening moveable bipartite column comprising the socket 10 and the ball 13 extending from a plate comprising the head's lowermost point.

Ball 13 is adjustable and socket 10 joint allows for the head to tilt in all axes. This allows for a movement that will be similar to that of a human head.

Figure 3:
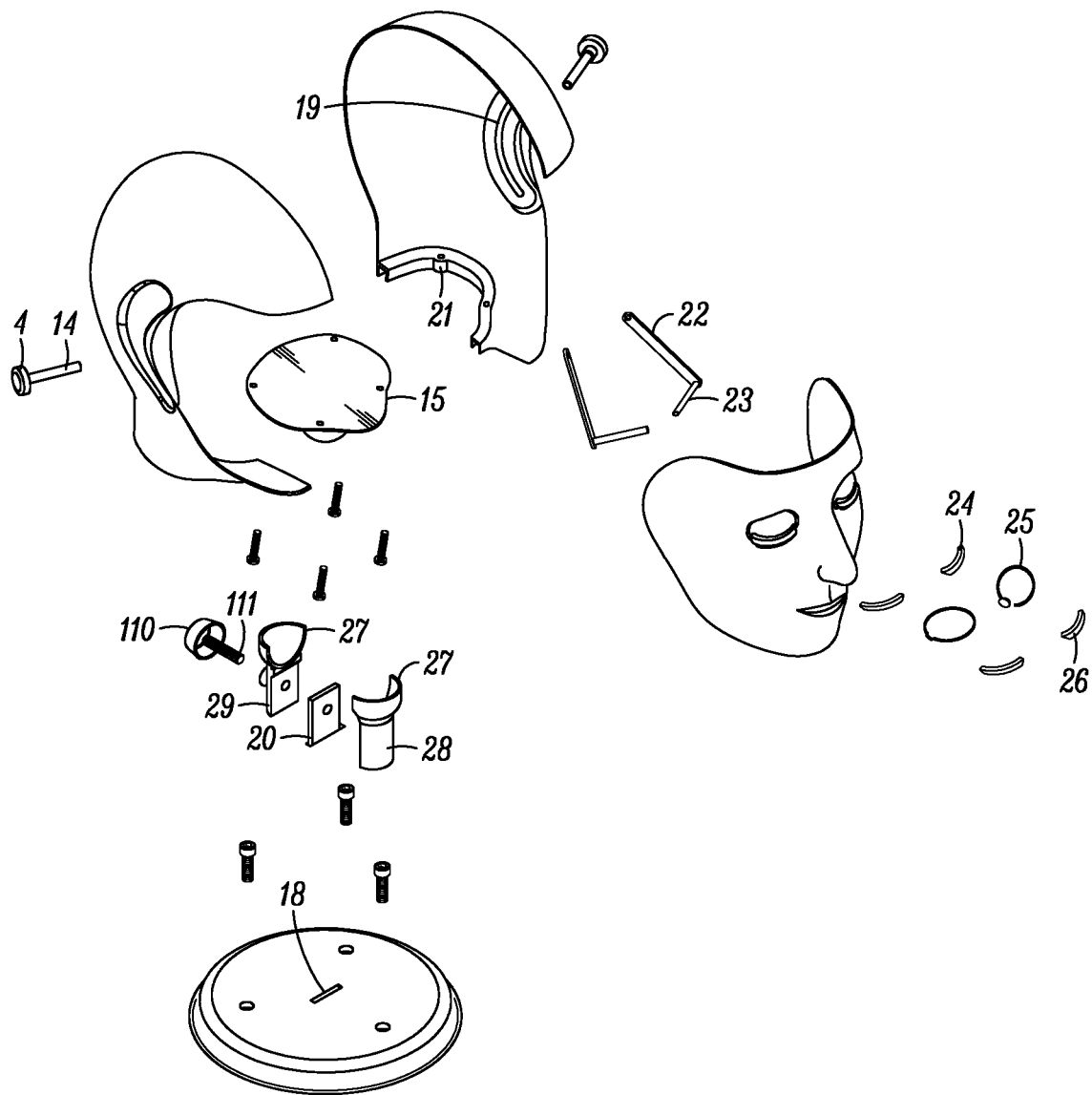
FIG. 3 shows an exploded isometric view of the embodiment shown in FIG. 1.
Figure 4:
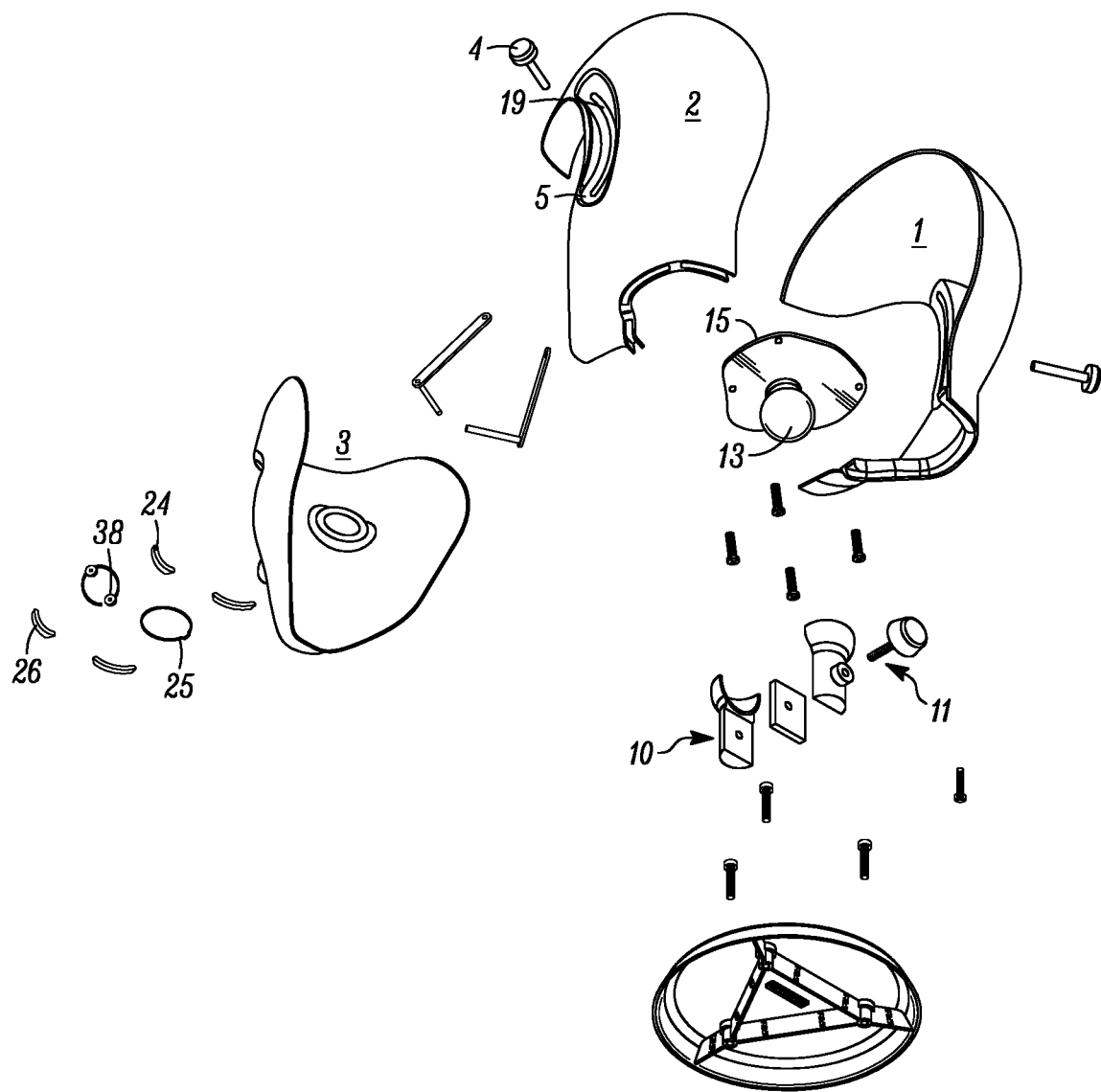
FIG. 4 shows a reverse exploded isometric view of the embodiment shown in FIG. 1.
Figure 5A:
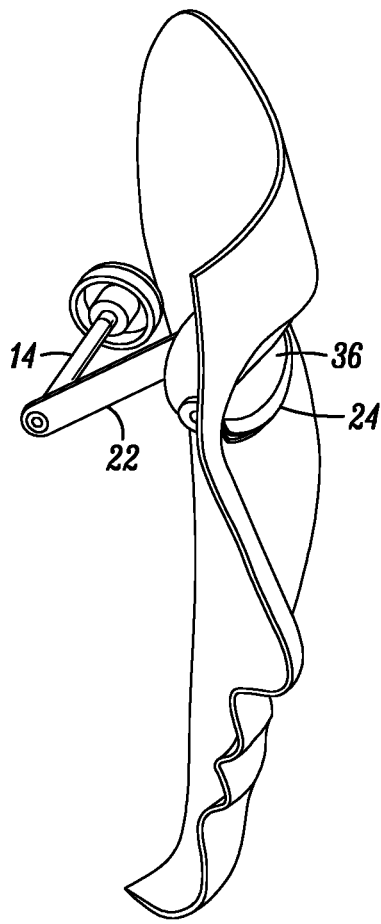
FIG. 5 show isometric detail views of the face of the embodiment shown in FIG. 1.
Figure 5B:
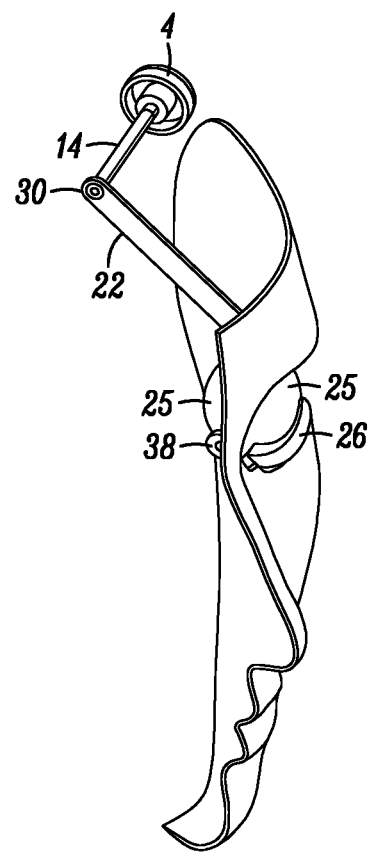
Figure 6A:
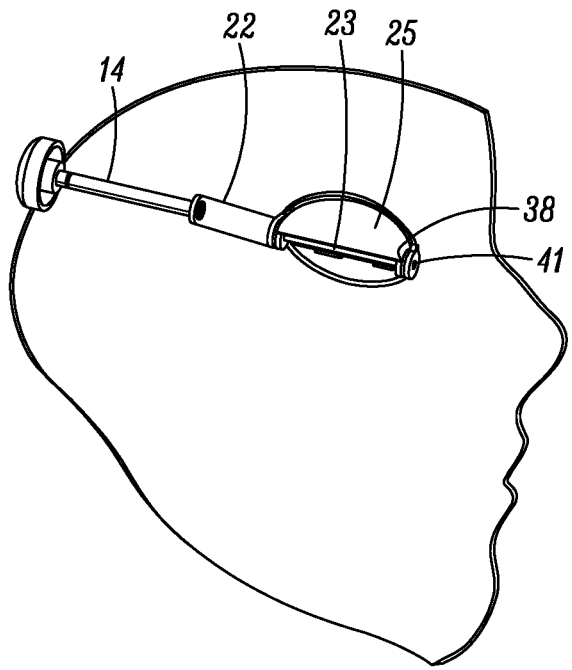
FIG. 6 show reverse isometric detail views of the face of the embodiment shown in FIG. 1.
Figure 6B:
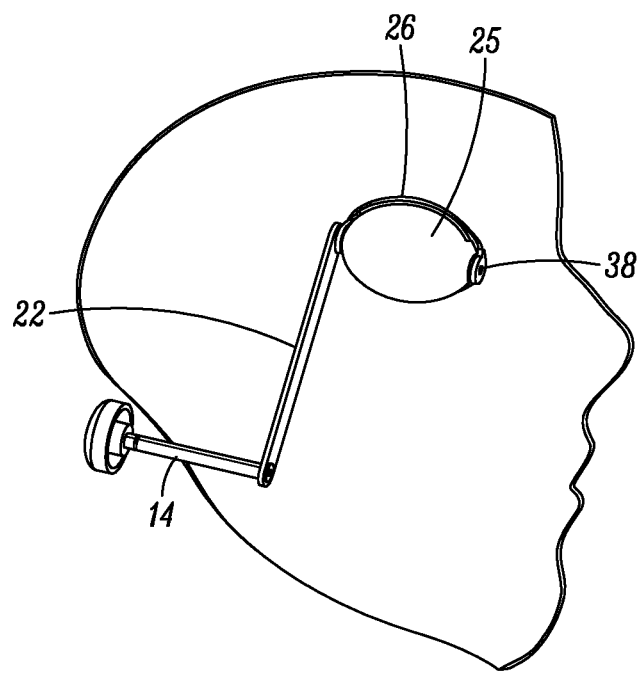
Figure 7A:
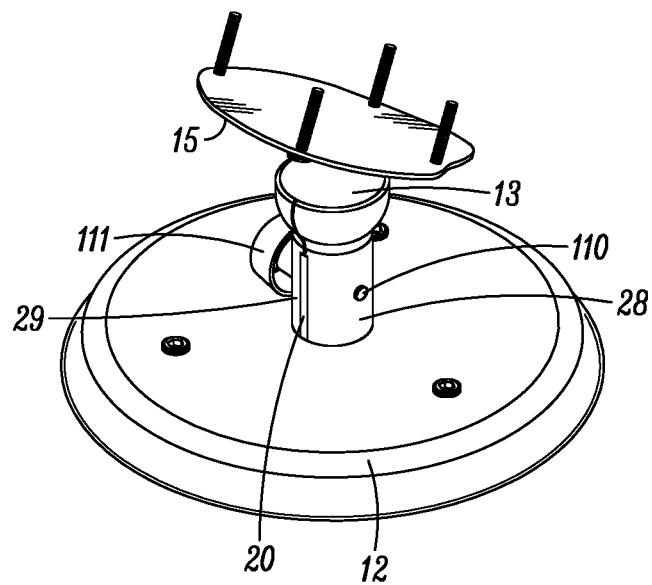
FIG. 7 show isometric views of the base of the embodiment shown in FIG. 1.
Figure 7B:
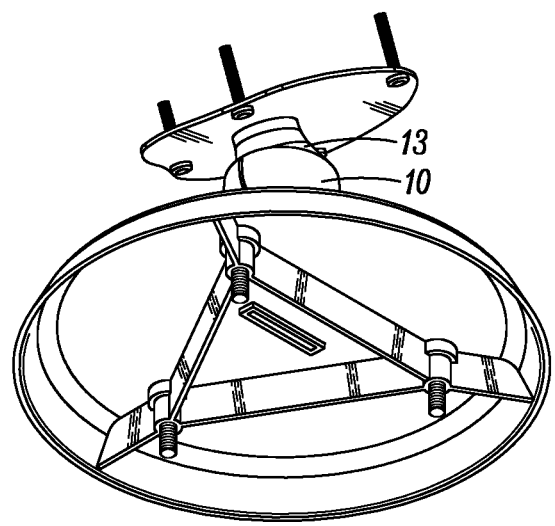
Figure 8A:
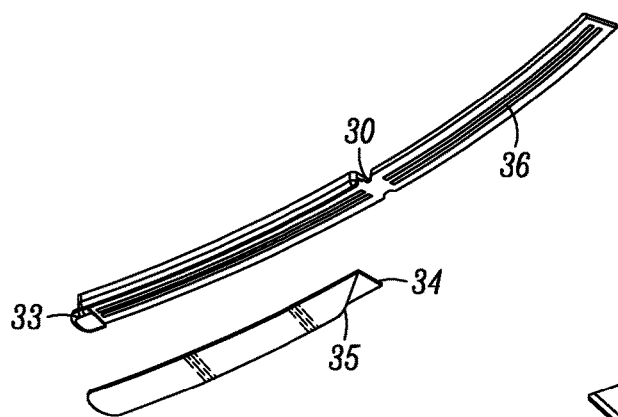
FIG. 8 show isometric views of eyelids for use with the embodiment shown in FIG. 1.
Figure 8B:
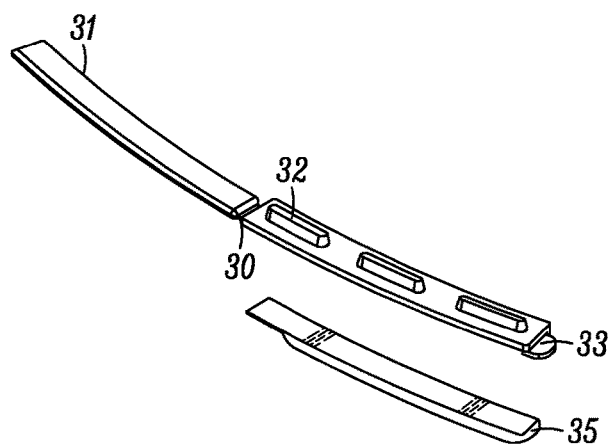
Figure 8C:
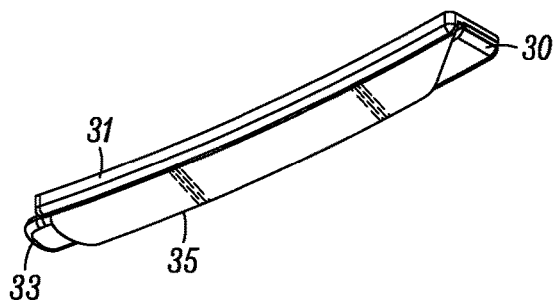
Figure 8D:
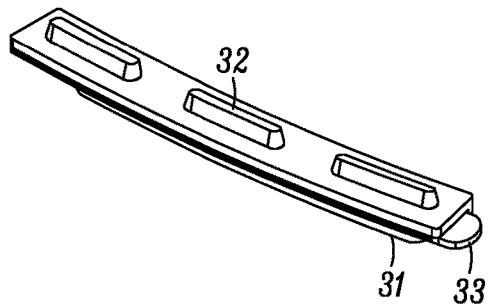

The column comprises two parts 28, 29 sandwiching a connection plate 20, which plate passes through a slot 18 in the base (see FIG. 3). The parts mutually travel on the worm screw so as to clasp or release the plate.

The base includes a weighting frame 16 which is secured using bolts 17 to the base to lower the apparatus centre of balance.

The head comprises three parts, namely a face 3 and shell provided in left 1 and right 2 shell sections. The shell sections 1, 2 provide a channel 5 on its sides, each of which channel 5 allows vertical travel of a control, which control controls a lever 14 which moves in a slot 19 in the channel and connects with members 22 pivoting on pivots 30. Moveable orthogonal portions 23 carry top eyelids 26 and a lid section 25, comprises a curved section extending behind the top eyelid for providing the top lid when the eye is 'closed'. Eyebrows are also added using a pad printing process.

In this way a lever 14 on each side may be displaced in the channel 5 to vary vertical position of the top eyelid and eyelash in each separate eye zone 6. Advantageous embodiments therefore allow for a plurality of differing eyelash positions to accommodate different styles, techniques and approaches of attaching eyelash extensions.

Figure 9A:
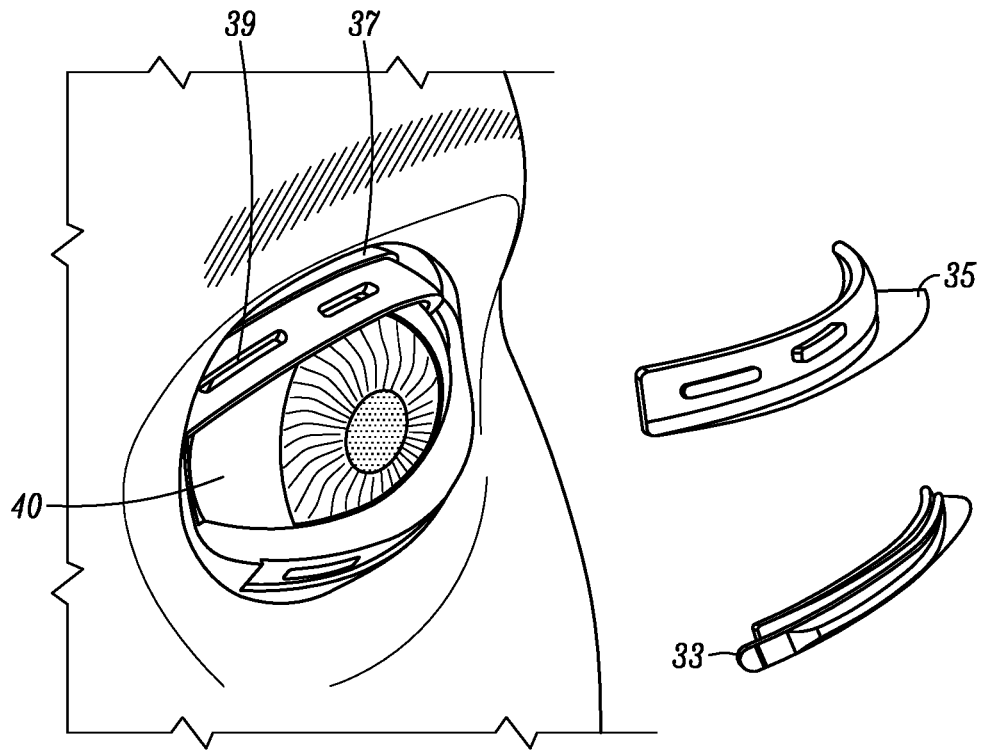
FIG. 9 shows a sketch of the eyelids and eyelashes, and a section view of an embodiment thereof, respectively.
Figure 9B:
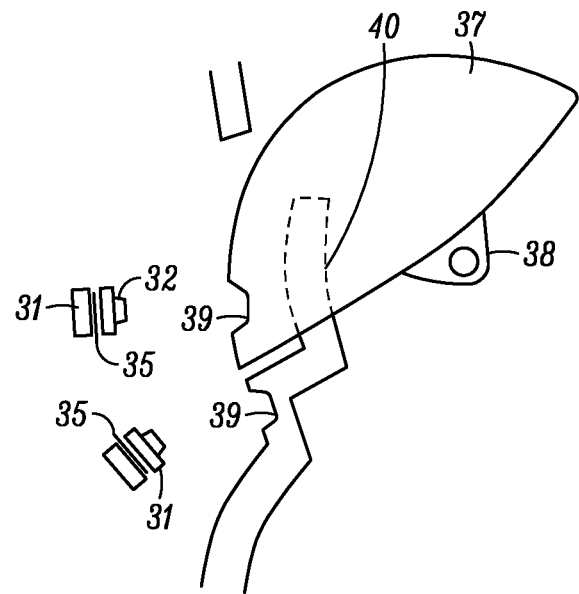

The front of the face 3 includes an upwardly extending eyeball section 40 (see FIG. 9) above the bottom eyelid 24 that replaces the need for the eyeball to be a separate part. This section is pad printed with pupil features of an eye so as to show when the eye is 'open'.

The eyes are controlled independently by an arm/lever 14 on each side of the head. The eyes have been developed to allow for 80° of revolution and can lock into 3 different positions.

The user has an option of open, closed or half way between. The corresponding parts of the sections 38, 41 where the lever portion 23 passes comprise bump interference fits corresponding to three positions, open, closed and half-open.

The eyelids are friction fit into the sections in indentations 39, to allow easy replacement.

The controls such as the lever 14 are positioned further back from the eye zones to allow clear access for applying lashes and mascara/semi-permanent mascara and eyelash perming.

The strips of eyelashes provide a realistic effect through use of standard strips of mink eyelashes and a thin polypropylene clamp or clip comprising an adaptor with the section connection studs 32 and layers 31, which are hinged together with a living hinge 30, with a thickness of 1.5 mm. Eyelashes 35 extend from bases 34 fixed between the two layers 31 which fold over using the living hinge 30 and snap fit together. Matching raised and lowered teeth 36 on the layers 31 create a temporary fixing.

This enables the strip to be flexible, to curve and fit into a slot on the eyelids. The studs on the rear stop the strip from coming out once it has been secured in place. A small tab 33 on the side allows for removal from the eye zones.

These strips are supplied in two different sizes, 480 mm and 340 mm one for the top eyelid and one for the bottom. Assembly may be completed by the manufacturer and sold in pre-determined quantities ready for use, or different eyelashes may be inserted between the layers in or before use.

The sections of the head are bonded together and hair may be included such that to achieve more realism, a hair line may be created using the split line where the parts join.

The apparatus may be supplemented by or supplied with a presentation board for displaying eyelashes once they completed, the board for example domed slightly so that they lie in the most realistic way possible. The board may hold a total of 12 pairs of lashes and includes a slot for a name tag underneath each one.

The invention has been described by way of examples only and it will be appreciated that variation may be made to the above-mentioned embodiments without departing from the scope of invention as defined by the claims.

The invention claimed is:

1. An apparatus for practicing application of eyelash extensions comprising:
    a head with a face section, the face section having a plurality of eye zones;
    a base for supporting the head; and
    a flexible, removable eyelash clip for fixing a plurality of replaceable eyelashes;
    wherein each eye zone of the plurality of eye zones includes a plurality of displaceable parts, including:
        an upper eyelid with a ratchet closure mechanism and a plurality of openings, wherein the ratchet closure mechanism allows the upper eyelid to be displaced to any one of a plurality of discrete positions between a first open eye position and a second closed eye position; and
        a lower eyelid having a closure mechanism and a plurality of openings;
    wherein the removable eyelash clip is configured to be removably mounted to a first selected one of the upper eyelid or the lower eyelid; and
    wherein the removable eyelash clip includes:
        an outer layer hinged to an inner layer, the outer layer folding over and snap-fitting to the inner layer to secure the plurality of replaceable eyelashes therebetween; and
        a plurality of protrusions on the inner layer forming plural connection points for mating with the plurality of openings of the first selected one of the upper eyelid or the lower eyelid.

2. The apparatus according to claim 1 wherein the upper eyelid is displaceable vertically.

3. The apparatus according to claim 2 wherein the upper eyelid is displaceable vertically by a lever.

4. The apparatus according to claim 3 wherein the lever is connected to a control which moves vertically in a slot provided on a side of the face section.

5. The apparatus according to claim 1 wherein the plurality of displaceable parts are independently displaceable.

6. The apparatus according to claim 1 wherein the head is moveable on the base.

7. The apparatus according to claim 6 wherein the head is moveable upon the base by means of a ball joint.

8. The apparatus according to claim 1 wherein the ratchet closure mechanism of the upper eyelid is controlled by an electrical switch.

9. The apparatus for practicing application of eyelash extensions according to claim 1, wherein:
   the removable eyelash clip includes a tab at one end for grasping to aid in demount of the removable eyelash clip from the selected one of the upper eyelid or the lower eyelid.

10. The apparatus for practicing application of eyelash extensions according to claim 1, wherein:
    a first lengthwise end of the removable eyelash clip includes a tab to aid demounting of the removable eyelash clip from the first selected one of the upper eyelid or the lower eyelid; and
    a second lengthwise end of the removable eyelash clip is formed by an upper surface of the removable eyelash clip folded over a lower surface of the removable eyelash clip.

11. The apparatus for practicing application of eyelash extensions according to claim 1, further comprising:
    a second removable eyelash clip different from the removable eyelash clip, the second removable eyelash clip for fixing a second plurality of replaceable eyelashes, the second removable eyelash clip including a second plurality of protrusions for mating with the plurality of openings of a second selected one different from the selected one of the upper eyelid or the lower eyelid.

12. The apparatus for practicing application of eyelash extensions according to claim 1, wherein:
    the closure mechanism of the lower eyelid includes a lower ratchet closure mechanism.

* * * * *